Dec. 2, 1924.
W. W. McDOWELL
1,518,085
ELECTRIC HEATER FOR STEERING WHEELS
Filed Feb. 4, 1924
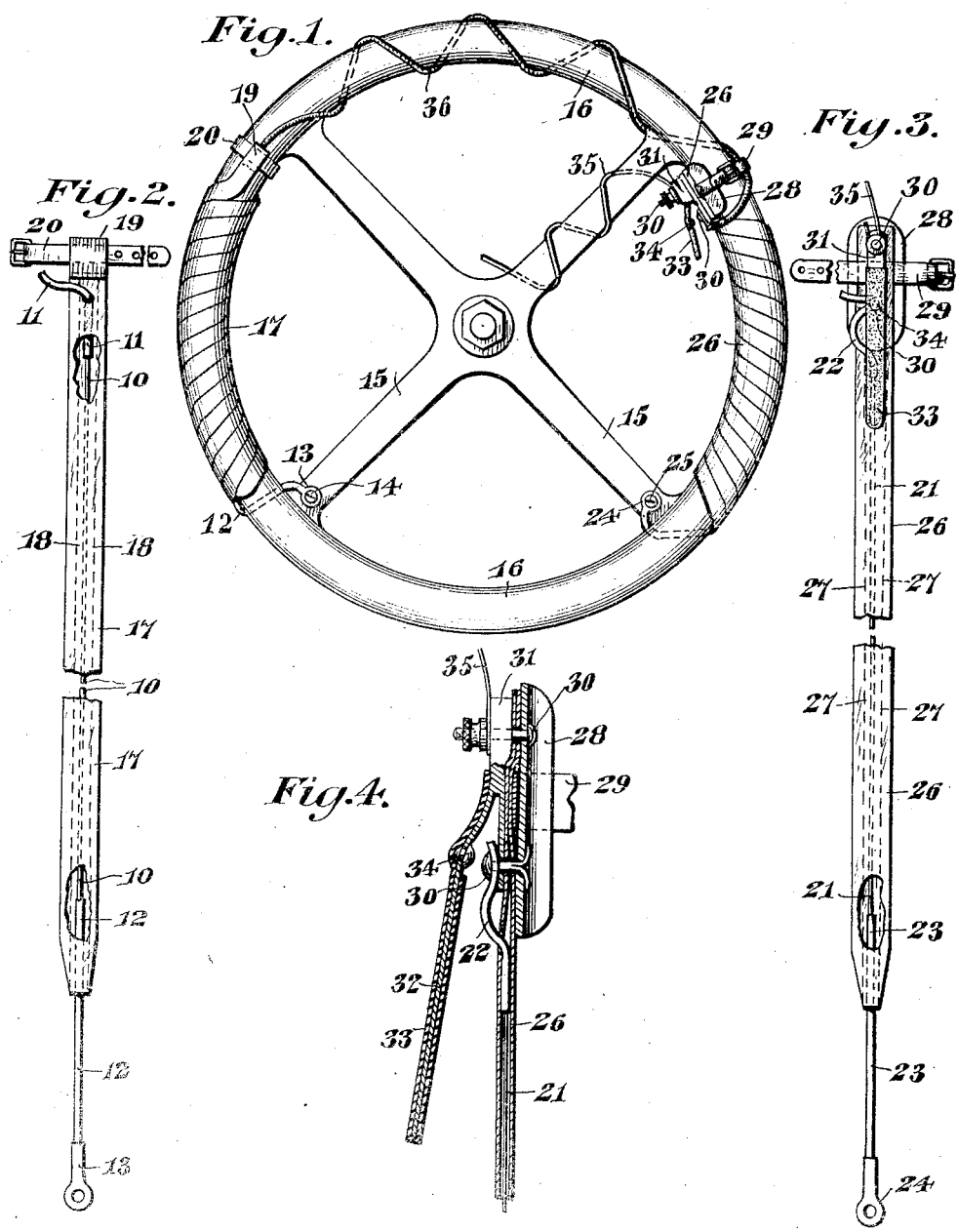
Walter W. McDowell, INVENTOR.
ATTORNEY.

Patented Dec. 2, 1924.

1,518,085

UNITED STATES PATENT OFFICE.

WALTER W. McDOWELL, OF KIEFER, OKLAHOMA, ASSIGNOR OF ONE-THIRD TO R. E. E. STEIGLEDER AND ONE-THIRD TO FRANCIS M. RIGDON, BOTH OF KIEFER, OKLAHOMA.

ELECTRIC HEATER FOR STEERING WHEELS.

Application filed February 4, 1924. Serial No. 690,471.

*To all whom it may concern:*

Be it known that I, WALTER W. McDOWELL, a citizen of the United States, residing at Kiefer, in the county of Creek and State of Oklahoma, have invented certain new and useful Improvements in Electric Heaters for Steering Wheels, of which the following is a specification.

This invention relates to electric heating devices, more particularly to devices of this character designed to be applied to the rims of the steering wheels of motor driven vehicles to warm the hands of the operator, and has for one of its objects to simplify and improve the construction and increase the efficiency and utility of devices of this character.

Another object of the invention is to provide a device of this character capable of being adapted without material structural change to steering wheels, and other devices requiring the same, of various forms and sizes.

With these and other objects in view the invention consists in certain novel features of construction as hereinafter shown and described and then specifically pointed out in the claims, and in the drawings illustrative of the preferred embodiment of the invention.

Figure 1 is a plan view of a conventional steering wheel with the improvement applied.

Figure 2 is a plan view, detached of the device to be applied to the left side of the steering wheel.

Figure 3 is a plan view, detached, of the device to be applied to the right side of the steering wheel.

Figure 4 is an enlarged sectional detail of the switch device.

The improved device comprises a flexible member of conductive material reduced between the ends to offer resistance to the passage of an electric current and thereby to generate heat therein, and enclosed in an envelope of insulating fabric, and adapted to be wound, together with its envelope, around the object to be heater, for instance the rim of the steering wheel of an auto driven vehicle, to radiate heat to the hands of the operator. The enlarged ends of the conductor member are connected in circuit with a source of electric energy, for instance the battery of the ignition elements of the motor, or a special battery, as preferred, and a suitable switch operative by one hand of the operator, to control the flow through the conductors and the consequent heat generated thereby.

Two of the conductor elements and their attachments will be employed, one for the right hand and the other for the left hand of the operator and will be applied to the steering wheel at diametrically opposite points, as shown in Figure 1.

The left hand device is represented in Figure 2, and the right hand device in Figure 3.

The left hand device comprises a conductor element formed with a reduced intermediate portion 10 and enlarged terminal portion 11 and 12, the portion 12 terminating in an eye 13 to receive a holding screw 14 to enable the eye to be attached to one of the spokes 15 of the steering wheel, the rim of which is represented at 16. By this means the conductor at the left is grounded. The conductor member 10—11—12 is enclosed in an envelope or sheathing of nonconductive material, such as cloth, leather, or the like, and indicated at 17, and secured around the conductor in any suitable manner, for instance, by stitching as represented at 18. At one end the sheathing is drawn inwardly to closely enwrap the enlargement 12, and is extended at the other end into a loop 19 to receive a binding strap 20, to secure the conductor and its sheathing to the wheel rim after being wound around the same, as shown at the left in Figure 1.

The right hand device comprises a conductor element formed with a reduced intermediate portion 21 and enlarged terminal portions 22 and 23, the portion 23 terminating in an eye 24 to receive a holding screw 25 to enable the eye to be attached to another of the spokes 15 of the steering wheel. By this means the conductor at the right is grounded.

The conductor members 21–22 and 23 are enclosed in an envelope or sheathing of nonconductive material such at cloth, leather or the like indicated at 26, and secured around the conductor in any suitable manner, for instance by stitching as represented at 27. At one end the sheathing 26 is drawn inwardly to closely enwrap the portion 23 of the enlargement.

A switch device is located at the other terminal of the right hand conductor, and comprises a base portion 28 preferably of leather, and attachable by a strap or the like device 29 to the wheel rim.

The sheathing 26 is extended and riveted or otherwise attached to the member 28, as shown at 30.

Secured to the outer face of the extended portion of the sheathing 26, preferably by the same rivets 30 by which the members 26 and 28 are united, is a plate 31 having a resilient arm 32 extending therefrom and initially at an angle to the longitudinal axis of the plate, as shown in Figure 4. The arm portion 32 is encased in a non conductive sheath indicated at 33, and is provided with a contact 34 in position to engage an opposing contact carried by the plate 31, for instance the head of the adjacent rivet 30.

The portion 22 of the conductor is coupled to the adjacent contact rivet 30, while another conductor 35 is connected to the other rivet 30. The rivet 30 to which the conductor portion 22 is coupled is insulated from the plate 31.

The arm 32 extends along the inner face of the sheathing 26 of the right hand conductor, so that the operator can compress the arm and close a circuit through the contact 30 and 34, and will automatically break the circuit when the pressure of the hand is removed.

The terminals of the enlarged portions 11 and 22 of the conductors are connected by a conductor 36, as shown.

By this simple means effective and convenient means are provided for warming the hands of the operator in cold weather, which may be quickly applied and without disfiguring or marring the rim of the wheel.

The heat may be generated at the will of the operator by merely compressing the arm 32, and the heating discontinued when not required by releasing the arm.

The improved device is simple in construction, can be inexpensively manufactured, and adapted to any device which requires such an appliance.

The preferred embodiment of the invention is disclosed in the drawings and set forth in the specification, but it will be understood that modifications within the scope of the claimed invention may be made in the construction without departing from the principle of the invention or sacrificing any of its advantages.

What is claimed as new is:

1. A device of the class described comprising a resistance element, a plate connected to said resistance element and insulated therefrom, a resilient arm extending from said plate and having a contact normally maintained yieldably spaced from said plate, and means for connecting said resistance element and said arm and its contact in circuit with a source of electric energy.

2. The combination with a steering device of a resistance element adapted to enclose the steering device and connected at one end thereto to secure a grounding connection, a plate connected to the other end of said resistance element and insulated therefrom, a resilient arm extending from said plate and having a contact normally maintained yieldably spaced from said plate, and means for connecting said resistance element and said arm and its contact in circuit with a source of electric energy.

In testimony whereof, I affix my signature hereto.

WALTER W. McDOWELL.